US008773571B2

(12) United States Patent
Strong

(10) Patent No.: US 8,773,571 B2
(45) Date of Patent: *Jul. 8, 2014

(54) FLEXIBLE LENS MOUNT SYSTEM FOR RAPID TILT PHOTOGRAPHY

(71) Applicant: Lensbaby, LLC, Portland, OR (US)

(72) Inventor: Craig Strong, Portland, OR (US)

(73) Assignee: Lensbaby, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,270

(22) Filed: Oct. 16, 2012

(65) Prior Publication Data

US 2013/0038788 A1   Feb. 14, 2013

Related U.S. Application Data

(63) Continuation of application No. 12/859,739, filed on Aug. 19, 2010, now Pat. No. 8,289,436, which is a continuation of application No. 10/571,151, filed as application No. PCT/US2004/033141 on Oct. 7, 2004, now Pat. No. 7,800,680.

(60) Provisional application No. 60/509,368, filed on Oct. 7, 2003.

(51) Int. Cl.
*G02B 13/16* (2006.01)
*H04N 5/225* (2006.01)

(52) U.S. Cl.
USPC .......................................... 348/335; 348/375

(58) Field of Classification Search
USPC ................................................. 348/335, 375
See application file for complete search history.

(56) References Cited

U.S. PATENT DOCUMENTS

| 395,899 A | 1/1889 | Hasey |
| 1,110,116 A | 9/1914 | Dietz |
| 1,605,725 A | 11/1926 | Herbert, Jr. |
| 1,792,997 A | 2/1931 | Marks |
| 2,316,694 A | 4/1943 | Jarboe |
| 2,723,593 A | 11/1955 | Gruner |
| 3,262,360 A | 7/1966 | Gruner et al. |
| 3,479,945 A | 11/1969 | Koch |
| 3,623,415 A | 11/1971 | Atzmüller |

(Continued)

FOREIGN PATENT DOCUMENTS

| DE | 1029053 | 4/1958 |
| DE | 2156886 | 5/1972 |

(Continued)

OTHER PUBLICATIONS

International Search Report and Written Opinion for PCT/US08/88681, Lensbabies, LLC, issued Feb. 19, 2009.

(Continued)

*Primary Examiner* — Sinh Tran
*Assistant Examiner* — Jason Flohre
(74) *Attorney, Agent, or Firm* — Marger Johnson & McCollom PC

(57) ABSTRACT

The disclosure generally relates to photography, including both still photography and video photography. One aspect of the invention is directed toward a lens system that includes a lens, a fitting mountable to a camera, and a flexible body extending between the lens and the fitting. The fitting can be the sole support for the body relative to the camera. The body can be configured to position the lens among at least two operative positions relative to the camera when the fitting is mounted to the camera.

21 Claims, 8 Drawing Sheets

(56) References Cited

U.S. PATENT DOCUMENTS

| | | | |
|---|---|---|---|
| 3,713,725 | A | 1/1973 | Uesugi |
| 3,796,569 | A | 3/1974 | Kondo et al. |
| 3,799,151 | A | 3/1974 | Fukaumi et al. |
| 3,825,938 | A | 7/1974 | Koch |
| 3,904,279 | A | 9/1975 | Sanada |
| 4,196,990 | A | 4/1980 | Forsyth |
| 4,229,094 | A | 10/1980 | Bäab et al. |
| 4,251,134 | A | 2/1981 | Sato et al. |
| 4,264,161 | A | 4/1981 | Hosoe et al. |
| 4,264,167 | A | 4/1981 | Plummer |
| 4,281,916 | A | 8/1981 | Aoyagi |
| 4,291,944 | A | 9/1981 | Nomura |
| 4,299,470 | A | 11/1981 | Shimizu |
| 4,771,302 | A | 9/1988 | Hamada et al. |
| 4,946,255 | A | 8/1990 | Mizoguchi et al. |
| 4,949,126 | A | 8/1990 | Frelier et al. |
| 5,168,298 | A | 12/1992 | Hirai |
| 5,194,988 | A | 3/1993 | Flöther et al. |
| 5,211,471 | A | 5/1993 | Rohrs |
| 5,289,215 | A | 2/1994 | Clairmont et al. |
| 5,309,541 | A | 5/1994 | Flint |
| 5,592,331 | A | 1/1997 | Eastcott |
| 5,640,630 | A | 6/1997 | Hattan |
| 5,682,199 | A | 10/1997 | Lankford |
| 5,790,319 | A | 8/1998 | Okada et al. |
| 5,825,461 | A | 10/1998 | Ruffell |
| 5,841,590 | A | 11/1998 | Sato |
| 5,873,817 | A | 2/1999 | Kokish et al. |
| 5,878,295 | A | 3/1999 | Katagiri et al. |
| 6,318,912 | B1 | 11/2001 | Shono et al. |
| 6,503,000 | B1 | 1/2003 | Kim |
| 6,556,363 | B2 | 4/2003 | Chiu |
| 6,590,574 | B1 | 7/2003 | Andrews |
| 6,597,518 | B2 | 7/2003 | Nomura et al. |
| 7,085,082 | B2 | 8/2006 | Donner et al. |
| 2002/0003965 | A1 | 1/2002 | Landelle et al. |
| 2004/0125471 | A1 | 7/2004 | Chen |
| 2006/0115251 | A1 | 6/2006 | Nomura |
| 2006/0115254 | A1 | 6/2006 | Nomura |
| 2006/0115256 | A1 | 6/2006 | Nomura |
| 2006/0115257 | A1 | 6/2006 | Nomura |
| 2007/0024740 | A1 | 2/2007 | Strong |
| 2007/0146907 | A1 | 6/2007 | Zhao et al. |
| 2007/0189765 | A1 | 8/2007 | Schulte |

FOREIGN PATENT DOCUMENTS

| | | |
|---|---|---|
| DE | 2302695 | 8/1973 |
| DE | 7302053 | 8/1973 |
| DE | 2215086 | 10/1973 |
| DE | 2801994 | 7/1979 |
| DE | 2829927 | 1/1980 |
| DE | 2855496 | 7/1980 |
| DE | 3047096 | 7/1982 |
| DE | 3304115 | 8/1984 |
| DE | 3423596 | 1/1986 |
| DE | 3627115 | 2/1986 |
| DE | 3436886 | 4/1986 |
| DE | 3627145 | 2/1988 |
| DE | 3835061 | 4/1989 |
| DE | 4021375 | 1/1991 |
| DE | 4201169 | 7/1992 |
| DE | 9311283 | 10/1993 |
| DE | 4230838 | 3/1994 |
| DE | 29609096 | 11/1996 |
| DE | 19715451 | 12/1998 |
| DE | 19804449 | 8/1999 |
| DE | 20000242 | 5/2000 |
| DE | 10033150 | 1/2001 |
| DE | 10229053 | 3/2004 |
| DE | 10336817 | 4/2004 |
| DE | 10359193 | 7/2005 |
| DE | 102004008072 | 10/2005 |
| DE | 102005057411 | 6/2006 |
| DE | 102005057412 | 6/2006 |
| DE | 102005057495 | 6/2006 |
| DE | 102005057514 | 6/2006 |
| DE | 102005048425 | 4/2007 |
| EP | 0507848 | 10/1992 |
| EP | 0841583 | 5/1998 |
| EP | 0974862 | 1/2000 |
| EP | 1102107 | 5/2001 |
| EP | 1168831 | 1/2002 |
| EP | 1331807 | 7/2003 |
| EP | 1336206 | 8/2003 |
| EP | 1466209 | 10/2004 |
| EP | 1671180 | 6/2006 |
| EP | 1712952 | 10/2006 |
| EP | 1723782 | 11/2006 |
| FR | 1592675 | 6/1970 |
| FR | 2660080 | 9/1991 |
| GB | 1285619 | 8/1972 |
| GB | 1370197 | 10/1974 |
| JP | 63197926 | 8/1988 |
| JP | 07123304 | 5/1995 |
| WO | WO9110157 | 7/1991 |
| WO | WO03058340 | 7/2003 |
| WO | WO2005036249 | 4/2005 |
| WO | WO2005060240 | 6/2005 |
| WO | WO2007042402 | 4/2007 |

OTHER PUBLICATIONS

Zörk Film & Phototechnic, "Multi Focus System," 1998, 3 pgs., http://www.zoerk.com/pages/p_mfs.htm (accessed Oct. 5, 2003).

Bjørn Rørslett/NN, "The PC-Nikkor 28 mm f/3.5 Modified Tilt/Shift Lens," Oct. 1, 2002, 3 pgs., http://www.naturfotograf.com/28pc.html (accessed Oct. 5, 2003).

Mark Tucker, "The PlungerCam: The Ugliest Camera Known to Man," 4 pgs., http://marktucker.com/plungercam/index.html (accessed Oct. 5, 2003).

HP Marketing Corp., "Linhof Technikardan Cameras," New Jersey, 4 pgs., http://www.hpmarketingcorp.com/Product%20descriptions/tk.html (accessed Oct. 5, 2003).

FLEXIBLE LENS MOUNT SYSTEM FOR RAPID TILT PHOTOGRAPHY

CROSS-REFERENCE TO RELATED APPLICATION(S)

This application is a continuation of U.S. application Ser. No. 12/859,739, filed Aug. 19, 2010, and currently pending, which is a continuation of U.S. National Phase Application No. 10/571,151, filed Mar. 9, 2006, based on International Application No. PCT/US2004/033141, filed Oct. 7, 2004, which claims the benefit of U.S. Provisional Patent Application No. 60/509,368, filed Oct. 7, 2003, all of which are incorporated herein by reference.

TECHNICAL FIELD

This disclosure generally relates to photography, including both still photography, video photography, and motion film photography. In some embodiments, the invention provides flexible lens systems that are particularly well-suited for rapid snapshots, e.g., with a digital camera.

BACKGROUND

Upon photographing a large surface, the entirety of the object to be taken cannot always fit within a field of focus. In such a case, the close and/or distant portion(s) of the object become out of focus. Photographers can expand the area in focus with an adapter having a tilt mechanism, typically a tilt/shift lens, that tilts the photographic lens relative to the camera body. Unfortunately, most existing tilt and shift lenses are precision instruments that employ precisely adjusted mechanical controls to focus the lens and to adjust the angle of the lens relative to the image capture plane (which may be film or a digital sensor, depending on the type of camera).

The precise control may be useful for some controlled settings in studios, but can significantly complicate photography in the field. The general perception of tilt/shift lenses is that they are cumbersome to use, slow to operate, demand tripod use, and can require manual, instead of automatic, exposure modes. Conventional tilt/shift lenses are relatively heavy, as well, further limiting their practical use. These lenses are also quite expensive, with most commercial tilt/shift lenses costing well in excess of US$1,000.

Some photographers also use bellows cameras to achieve photographic effects. For example, such cameras may be used to produce artistic effects, such as soft focus images wherein a portion of the image may be in sharp focus but a peripheral region may be out of focus. Many bellows cameras rely on heavy, cumbersome rails that protrude from the bottom of the camera to guide the lens as it moves in and out relative to the camera body. This added weight and mechanical complexity has largely limited bellows cameras to studio photography.

Many digital cameras are significantly smaller and lighter than more conventional 35 mm cameras. As a result, many digital cameras are generally considered more easily transportable, e.g., in a pocket instead of a large camera bag, and convenient for spontaneous photographs. The heavy, bulky nature of conventional tilt/shift lenses and bellows lenses is incompatible with the convenience and freedom afforded by digital cameras.

Embodiments of the invention address these and other limitations of the prior art.

DETAILED DESCRIPTION

A. Overview

Figure 1:
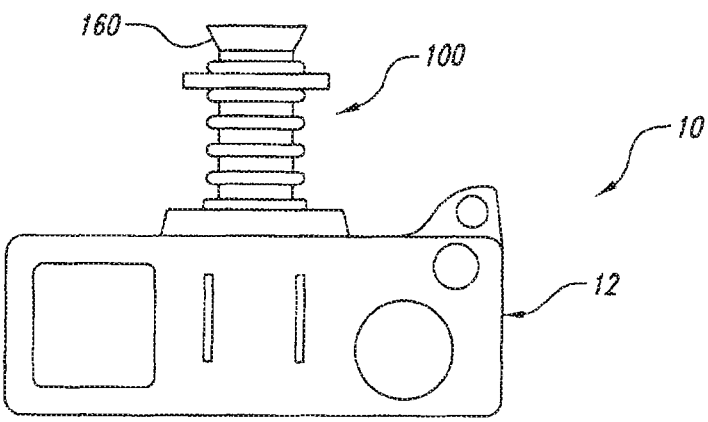
FIG. 1 is a top plan view schematically illustrating a camera system having a lens system and an optical device in accordance with an embodiment of the invention.

Various embodiments of the present invention provide flexible lens systems and camera systems employing flexible lens mounts. Except where context dictates otherwise, the term "lens" is used throughout to include both a single lens and a set of lenses and the term "photography" is used throughout to include both still and video photography accomplished using a camera system (e.g., a conventional 35 mm camera, a digital camera, and/or a video camera or recorder). Similarly, except where context dictates otherwise, the term photograph is used throughout to include one or more images produced, at least in part, by a camera system (e.g., conventional photograph(s), digital image(s), video recording(s), and/or motion film photography). The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

One aspect of the invention is directed toward a lens system that includes a lens, a fitting mountable to a camera, and a resiliently flexible body extending between the lens and the fitting. The fitting can be the sole support for the body relative to the camera. The body can be configured to position the lens among at least two operative positions relative to the camera when the fitting is mounted to the camera. If so desired, the body can have a rest position to which it at least approximately returns after being moved away from the rest position and released.

A lens system in accordance with another embodiment of the invention includes a lens, a fitting that is mountable to a camera, and a flexible body that extends between the lens and the fitting. The fitting is the sole support for the body relative to the camera. The body is configured to selectively retain any one of a plurality of discrete configurations, each of which positions the lens differently relative to the fitting.

Another embodiment of the invention provides a lens system that includes a lens, a fitting mountable to a camera, a flexible body extending between the lens and the fitting, and a lens support. The fitting is the sole support for the body relative to the camera. The body is configured to position the lens among at least two operative positions relative to the camera when the fitting is mounted to the camera; the body includes a tubular segment. The lens is coupled to the body by the lens support. At least one portion of the lens support is received by the tubular segment of the body and is movable relative to at least a portion of the tubular segment of the body.

One further embodiment of the invention relates to a method for adjusting focus of a camera using a lens assembly. In accordance with this method, the lens assembly is attached to a camera with a fitting that serves as a sole support for a body of a lens assembly relative to the camera. The lens assembly is reconfigured from a first configuration to a second configuration by manually flexing the body of the lens assembly. A lens of the lens assembly has a first operative position relative to the camera in the first configuration and a different second operative position relative to the camera in the second configuration.

Yet another embodiment of the invention provides a method of photographing a subject that includes orienting a camera with respect to the subject. The camera has a lens system that includes a fitting, a lens, and a tubular, resiliently flexible body extending between the fitting and the lens. A length of at least a portion of the body is manually adjusted by acting against a restoring force of the resiliently flexible body, thereby adjusting focus. The method may further include taking at least one photograph with the adjusted focus.

For ease of understanding, the following discussion is broken down into two areas of emphasis. The first section discusses various flexible lens systems and camera systems employing flexible lens systems in accordance with embodiments of the invention. The second section outlines methods of taking photographic images in accordance with other embodiments of the invention.

B. Flexible Lens Systems and Camera Systems Employing Flexible Lens Systems

FIGS. 1-6 schematically illustrate a camera system 10 and a lens system 100 in accordance with embodiments of the invention. The camera system 10 (FIG. 1) generally includes the lens system 100 coupled to a camera body or camera 12. The camera 12 may be any conventional still or video camera. In one embodiment, the camera 12 comprises a 35 millimeter camera, e.g., a 35 millimeter SLR camera. In other embodiments, the camera 12 can include a larger or smaller format camera (e.g., a camera with a larger or smaller lens and/or image capture size). In one useful embodiment of the invention, the camera 12 comprises a digital camera having a suitable display (not shown) for viewing an image captured by the camera, as is conventional in the art.

Also in FIG. 1, an optical device 160 (e.g., a filter or conversion lens) for providing various optical affects (e.g., softening a photographic image) is coupled to the lens system 100. The optical device 160 and the lens system 100 can be configured so that the optical device 160 is releasably coupled to the lens system 100 opposite from where the lens system 100 couples to the camera 12. In other embodiments, the optical device 160 can be permanently attached to the lens system 100. In still other embodiments of the invention, an optical device 160 is not used.

Figure 2:
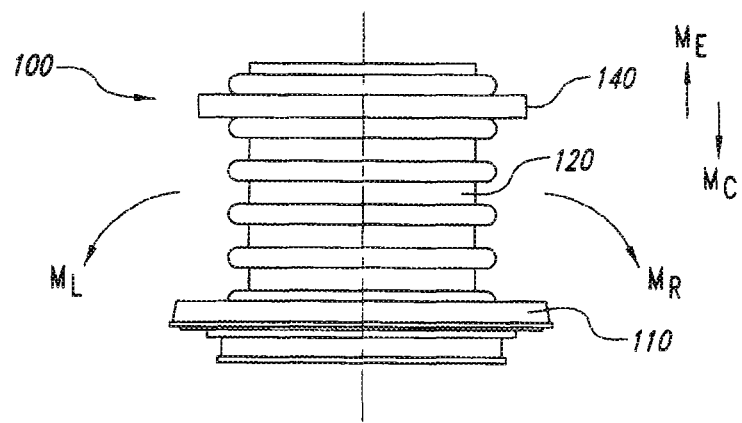
FIG. 2 is a top plan view of the lens system in FIG. 1.
Figure 5:
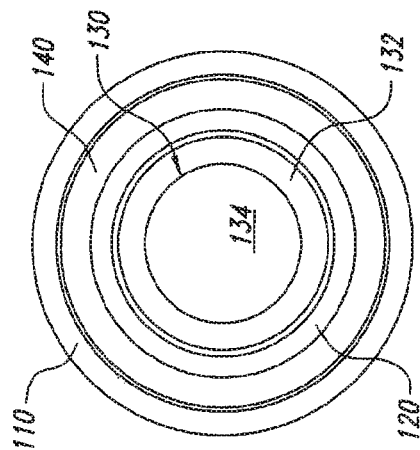
FIG. 5 is a front view of the lens system of FIGS. 2-4.
Figure 4:
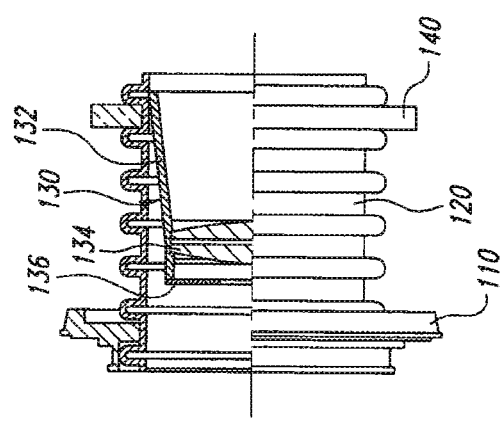
FIG. 4 is a side view, in partial cross section (taken along line 4-4 in FIG. 3), of the lens system of FIGS. 2 and 3.
Figure 3:
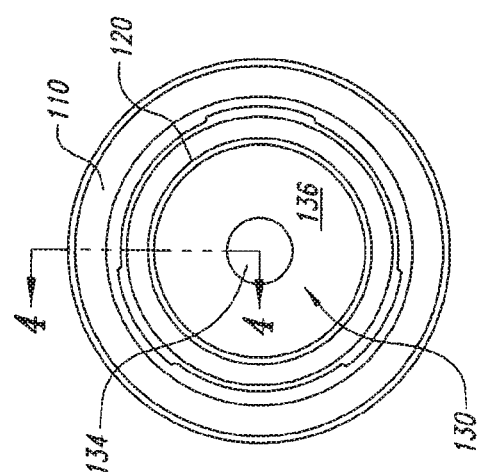
FIG. 3 is a rear view of the lens system of FIG. 2.

FIGS. 2-5 illustrate aspects of a lens system 100 in accordance with one embodiment of the invention. The lens system 100 includes a camera mount or fitting 110, a flexible body 120, and a lens assembly 130 (FIGS. 3-5). The camera mount 110 may be a plastic or aluminum mount of the type commonly used to mount a lens to a camera. The mounting system may differ from one camera to another, e.g., from a Canon to a Minolta, but the camera mount 110 is easily adaptable for use with a wide variety of camera bodies 12. In certain useful embodiments, the fitting 110 can be the sole support for the lens system 100 relative to the camera 12.

The flexible body 120 of the lens system 100 is coupled to the camera mount 110 adjacent to an end of the body 120. This permits the camera mount 110 to effectively attach the lens body 120 to the camera 12. The lens body 120 may be formed of a flexible tubular material. In the illustrated embodiment, the tubular material is generally circular in cross section. In other embodiments, the tubular body 120 may have a cross section that is not circular, e.g., ovoid, square, hexagonal, or any other suitable polyhedral shape. The length and transverse dimensions of the lens body 120 can be varied as desired (e.g., for different uses and/or different camera formats). Smaller bodies 120 will generally be lighter and more flexible than a larger body 120 formed of the same material. However, a body 120 having a larger transverse dimension (e.g., diameter in the illustrated embodiment) allows greater light capture and facilitates use of better quality lenses 134 (discussed below).

The body 120 should be sufficiently stiff to support the lens assembly 130 with respect to the camera 12, yet allow a user to flex the body 120 in a desired direction with relative ease. This feature can allow the user to move the body 120 and lens assembly 130 to various operative positions (e.g., positions where a photograph can be taken) to obtain various focusing effects. This is facilitated in the illustrated embodiment by forming the body 120 from a flexible polymeric material with a series of compressible ridges that can compress and/or expand as the body 120 is moved.

For example, one side of the body 120 can be compressed and an opposite side of the body 120 can be expanded to move the body and lens assembly 130 left or right as indicated by arrows $M_L$ and $M_R$ (shown in FIG. 2). The body 120 can be flexed up or down in a similar manner. The body 120 can also be compressed in the direction of arrow $M_C$ (shown in FIG. 2), shortening its length and moving the lens assembly 130 closer to the camera 12 (shown in FIG. 1), without materially changing the diameter of the body 120. Similarly, the body 120 can be expanded in the direction of arrow $M_E$ (shown in FIG. 2), lengthening the body 120 and moving the lens assembly 130 away from the camera 12 (shown in FIG. 1). Other embodiments can include other arrangements, for example, a body 120 that can be compressed, but not expanded; a body made from a different type of material (e.g., a composite), and/or a body without ridges. In still further embodiments, at least a portion of the flexible body 120 is formed from a rigid material and at least a portion of the body 120 is formed from a flexible material.

In the illustrated embodiment, the body 120 tends to resiliently return toward a rest position, which may be approximately perpendicular to the camera body 12 (FIG. 1), after removing (a) bending, compressing, and/or extending force(s). Accordingly, the bending, compressing, and/or extending force(s) must be maintained to hold the body 120 and lens assembly 130 in a selected operative position relative to the body of the camera 12.

In another embodiment, the body 120 can hold a selected position once it is moved to a selected position (e.g., the body 120 and lens assembly 130 can be placed in multiple operative positions). For example, the ridges can be configured to operate like the ridges on a bendable drinking straw and hold the body and lens assembly in the position in which they are placed by a user. In such an implementation, the body can selectively retain any one of a plurality of discrete configurations by selectively collapsing portions of at least some of the ridges, much in the same way that a bendable drinking straw can be bent between different configurations and retain each of those configurations. Each one of these configurations positions the lens 130 in a different operative position relative to the body of the camera 12 and the fitting 110.

Turning to FIGS. 3-5, the lens assembly 130 generally includes a lens support 132, a lens 134, and an aperture or f-stop 136. In the illustrated embodiment, the lens 134 is spaced rearwardly from the front end of the body 120 by the lens support 132. To permit easy flexure of the body 120, the lens support 132 may have a smaller dimension adjacent the lens than forwardly where it is attached to the body 120, allowing at least a portion of the lens support 132 to move relative to a portion of the body 120. In the particular embodiment shown in FIG. 4, the support 132 is generally frusto-conical. Other embodiments can have other arrangements, for example, the lens 134 can be mounted directly to the body. As discussed above, the lens 134, shown schematically in FIG. 4, can include a single lens or multiple lenses that are closely spaced together. In other embodiments, the body can support multiple lenses separated by a larger distance.

In the illustrated embodiment, the f-stop is a fixed aperture that controls how much light passes through the body 120 to the camera in a selected increment of time. In other embodiments, the f-stop can be replaceable, e.g., it may be a removable disk with an aperture that can be replaced by another disk having a differently sized aperture. In still other embodiments, the f-stop can be adjustable. For example, the f-stop can include a series of overlapping blades that can be moved or adjusted relative to each other to form different size apertures, similar to the f-stop used on current lenses. In yet other embodiments, the lens support 132 and/or the lens body 120 can form or act as an f-stop, controlling the volume of light that passes through the body 120 to the camera 12.

In one embodiment, a user may simply grasp the body 120 to manipulate or bend it. In the illustrated embodiment, a focusing collar 140 is carried by the body 120 adjacent its distal end. The illustrated focusing collar 140 is generally annular in shape, though other suitable shapes, e.g., square, may be used. Instead of a continuous collar, as shown, the focusing collar 140 may comprise a series of laterally outwardly extending flanges spaced at a fixed location about the periphery of the body 120. The focusing collar 140 may be formed of plastic, metal (e.g., aluminum), or any other suitable material.

Figure 6:
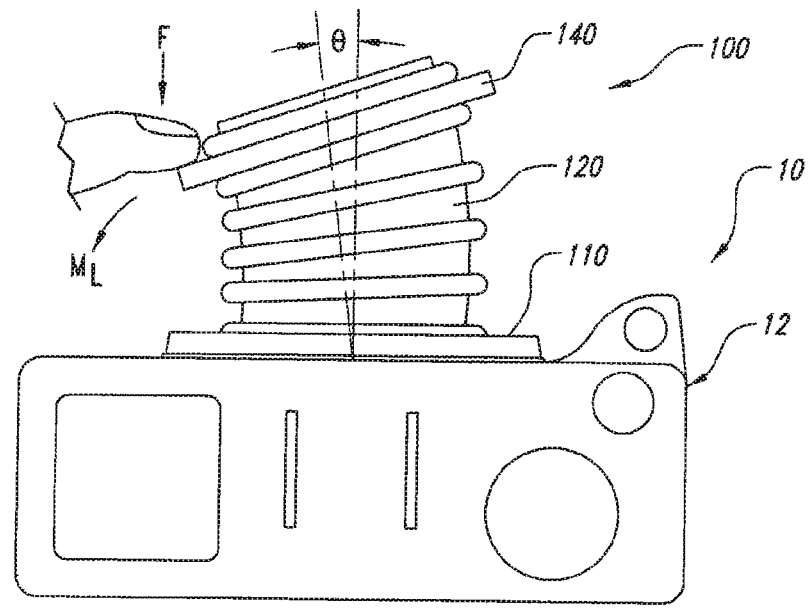
FIG. 6 is a top plan view schematically illustrating movement of the lens system of FIGS. 2-5 in accordance with one embodiment of the invention.

As suggested in FIG. 6, the body 120 of the lens system 100 can be flexed by manually engaging the focusing collar 140, e.g., with a finger 150, and applying a force F adjacent a side of the focusing collar 140. This will tend to compress the body 120 on one lateral side and may also stretch or extend the body 120 on the other lateral side, moving the body 120 and lens assembly 130 (shown in FIG. 4) as indicated by arrow $M_L$. This can have the effect of moving one portion (e.g., side or edge) of the lens 134 toward the camera 12 and another portion (e.g., an opposite side or edge) away from the camera. The center of the lens 134 can also move relative to the camera 12. The angle θ through which the body 120 can be flexed can vary significantly depending on the relative dimensions and flexibility of the body 120 and the relative dimensions and positions of the lens 134 and f-stop aperture 136 within the body 120. In one embodiment, the angle θ may be 90° or more. As discussed above, in certain embodiments, the body 120 can be manually extended or compressed to move the lens 134 away from or toward the camera 12, respectively.

The very simple design of the lens system 100 shown in FIGS. 1-6 allows lens systems in accordance with embodiments of the invention to be appreciably smaller and lighter than conventional tilt/shift camera lenses on the market today. By employing a relatively lightweight body 120 that has sufficient stiffness to support the lens assembly 130 with respect to the camera, the rails commonly required to support bellows lenses can be eliminated. Accordingly, lens systems 100 in accordance with certain embodiments of the invention can be quickly positioned to allow rapid operation with reduced weight as compared to the complex, finely-machined adjusting mechanisms of tilt/shift lenses. This is particularly convenient in the case of digital photography, which tends to emphasize reduced size, reduced weight, and simple, point-and-click photographic capability. The mechanical simplicity of the lens system 100 also allows it to be manufactured much less expensively than conventional tilt/shift lenses, permitting sale to a wide range of consumers instead of the limited appeal of conventional tilt/shift lenses to professional photographers or avid hobbyists.

C. Methods of Taking Photographic Images

As noted above, other embodiments of the invention provide methods of taking photographic images. In the following discussion, reference is made to camera system 10 of FIG. 1, and the particular flexible lens system 100 illustrated in FIGS. 2-6. It should be understood, though, that reference to these particular systems is solely for purposes of illustration and that the methods outlined below are not limited to any particular camera system or lens system shown in the drawings or discussed in detail above.

The camera system 10 with its lens system 100 can allow a photographer to achieve special focusing effects in a pliable, enjoyable to use, spontaneous fashion, in contrast to a cumbersome, hard-to-adjust tilt/shift lens, bellows camera, or perspective control lens. As discussed above, the lens system 100 can also be lighter, smaller, and easier to manufacture than previous or existing lenses.

Figure 7:
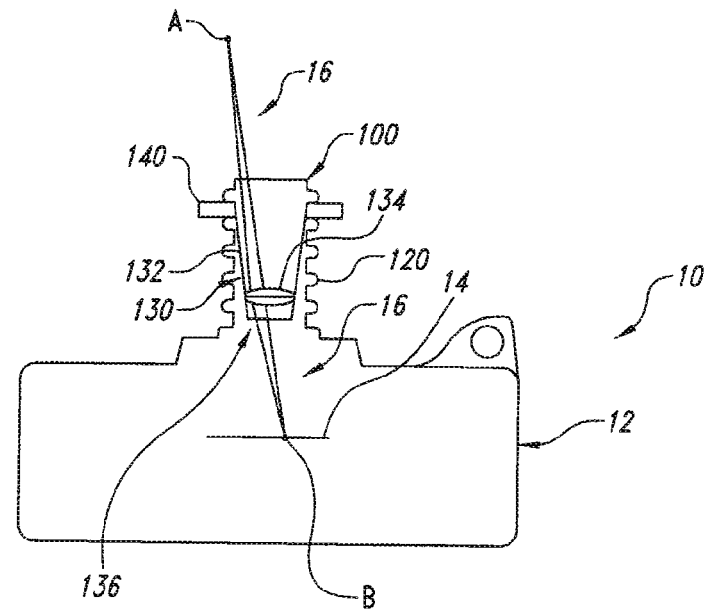
FIG. 7 is a top cross-sectional schematic illustration of the camera system shown in FIG. 1 with the optical device removed and showing an image capture plane.

The lens system 100 allows a photographer, while shooting photographs of active or inactive subjects, to use his or her finger(s) to manipulate freely and easily the lens angle and/or lens location relative to the image capture plane 14, shown in FIG. 7, to focus the camera system 10. Changing the lens angle and/or lens location relative to the camera 12 controls how light hits the image capture plane 14 (e.g., film or digital sensor). For example, in FIG. 7, the light reflected from point A (e.g., a subject) enters the camera and impacts the image capture plane at point B so that the image or subject will generally be in sharp focus. If desired, a user can focus the lens system 100 by positioning the body 120 so that a portion of the light reflected from point A enters the camera and is dispersed when it contacts the image capture plane 14 so that at least a portion of the image is not in sharp focus (e.g., the image is softer and/or blurred). Additionally, as point A moves relative to the camera, the user can focus the lens system 100 by moving the body to keep the image in sharp focus or to make at least a portion of the image softer.

The user may focus the camera system 10 by manually moving the lens assembly 130 in and out relative to the camera 12, and/or bending the body 120 in any direction relative to the camera body 12. Moving the lens assembly 130 away from the camera 12 (e.g., extending the body 120) allows the lens 134 to bring objects that are close to the camera into sharp focus. Compressing the body 120 moves the lens assembly 130 toward the camera, allowing the lens 134 to bring objects that are further away from the camera into sharp focus and/or allowing the lens 134 to focus at infinity.

The user can also change the area of the picture plane that is generally in sharp focus by pulling or extending a portion of the body 120. For example, in certain situations, the user can pull one point on the focusing collar 140 toward the camera, which causes the body 120 to bend up, down, left, or right. Correspondingly, the lens 134 within the body 120 moves relative to the camera 12 and can tilt up, down, left, or right. This can cause certain portions of the image or subject to come into sharp focus and other portions to the image to be softer or blurred. In other situations, bending the body 120 can cause a subject that is at an oblique angle to the camera 12 to be entirely in sharp focus.

One aspect of this operation is known in the art as the "Scheimpflug effect," which allows you to increase effective depth-of-field simply by tilting the camera lens along its axis in the direction of the image plane. This technique of sharpness distribution control, which is normally only possible with the swing and tilt movements of a conventional tilt/shift lenses, allows you to align the lens with any subject plane without changing the camera position or stopping down the lens (e.g., reducing the f-stop). This means that you can use a wider aperture and a faster shutter speed, reducing or eliminating the risk of camera shake or blur due to subject movement, or simply have greater overall depth-of-field for a given aperture. Additionally, this same principle can allow a photographer to intentionally soften or blur portions of the image to achieve more creative, photojournalistic-style compositions.

Figure 8A:
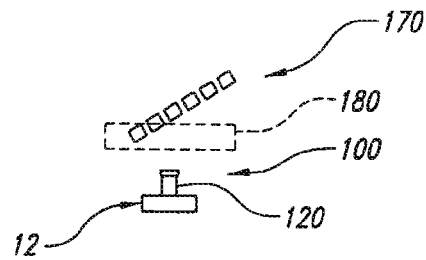
FIG. 8A is a partially schematic illustration of the camera system shown in FIG. 7 photographing a series of objects that are oblique to the camera body.

FIG. 8A is a partially schematic illustration of the camera system shown in

FIG. 7 photographing a series of objects that are at an oblique angle to the camera body 12. The lens system 100 is approximately perpendicular to the camera body 12 and the focus area 180 where objects will generally be in sharp focus is depicted by the area enclosed by dashed lines. Those objects 170 that are within the focus area 180 will generally appear to be in sharp focus. Those objects 170 that are not in the focus area 180 will not appear to be in sharp focus and can appear softer and/or blurred. The further away an object 170 is from the focus area 180, the softer or more blurred its image can appear. The focus area 180 can be moved by compressing, extending, and/or bending the lens body 120 of the lens system 100. For example, by compressing the body, the focus area 180 can be moved away from the camera.

Figure 8B:
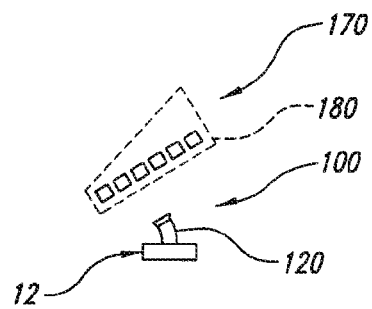
FIG. 8B is a partially schematic illustration the camera system in FIG. 8A photographing a series of objects from a different orientation than the one shown in FIG. 8A.
Figure 8C:
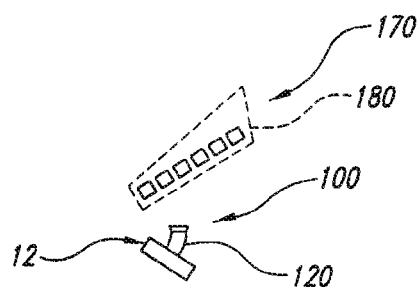
FIG. 8C is a partially schematic illustration of the camera system in FIG. 8A photographing a series of objects from a different orientation than the ones shown in FIGS. 8A and 8B.

The shape and/or orientation of the focus area relative to the camera body 12 can also be adjusted, as shown in FIGS. 8B and 8C. In FIGS. 8B and 8C the camera body 12 has been placed at different angles relative to a series of objects 170. The body 120 of the lens system 100 has been bent toward the objects so that the focus area 180 (shown in dashed lines) includes all of the objects 170. Accordingly, all the objects 170 will appear to be in generally sharp focus even though they are at varying distances from the camera 12. The user intuitively knows when this point is reached because the image in the camera viewfinder appears in focus from close range to distant range (e.g., all the objects appear to be in sharp focus). This feature/principle can also be used to move the focus area 180 so that certain objects 170 are not in sharp focus (e.g., are not in the focus area 180).

Figure 9A:
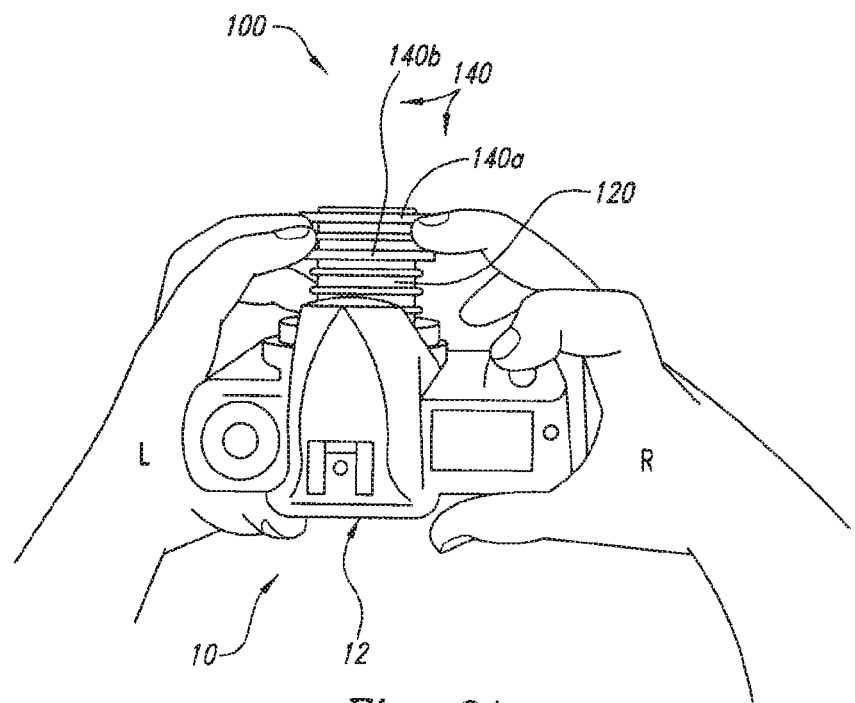
FIG. 9A is a partially schematic illustration of a camera system having a lens body with at least two focusing collars in accordance with another embodiment of the invention.
Figure 9B:
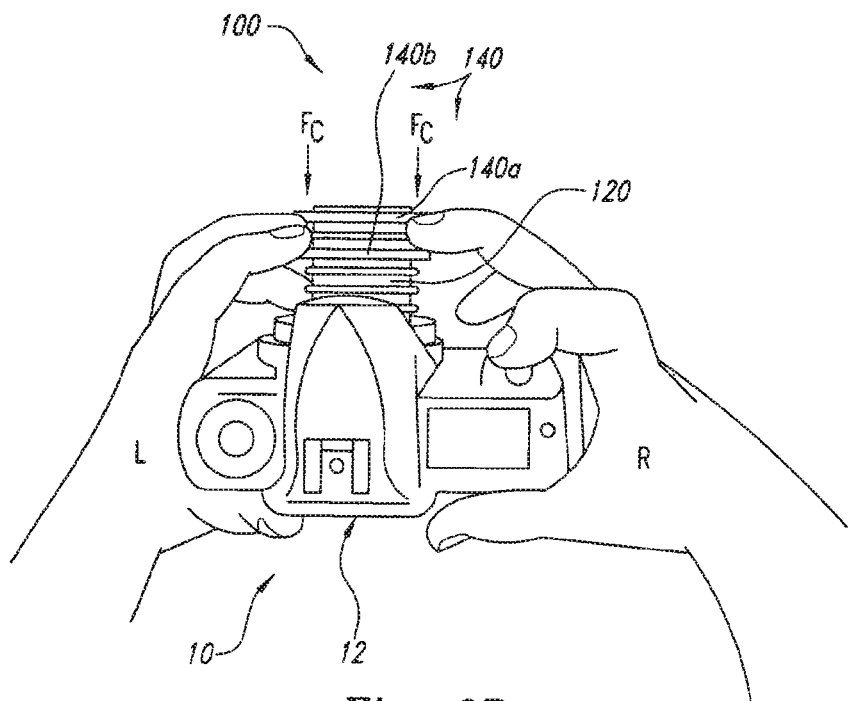
FIG. 9B is a partially schematic illustration of the camera system shown in FIG. 9A wherein at least a portion of the body is being compressed.

To facilitate focusing the camera, in certain embodiments, multiple focusing collars 140 can be coupled to the lens body 120. For example, the camera system 10 in FIG. 9A includes a lens system 100 having a flexible body 120 with two focusing collars 140, shown as a first focusing collar 140a and a second focusing collar 140b. Other arrangements can have more or fewer focusing collars 140. When the lens system 100 is attached to the camera 12 the focusing collars 140 can be used by an operator to manipulate the lens body to focus the camera system. For example, as shown in FIG. 9B, the operator can apply a compressing force (shown as $F_C$) to both sides of the second focusing collar 140b with the bottoms of the operator's fingers to compress at least a portion of the lens body 120 to focus the camera system 10. Similarly, the operator can apply an extending force (opposite the compressing force) to both sides of the first focusing collar 140a with the tops of the operator's fingers to extend at least a portion of the lens body 120.

Figure 9C:
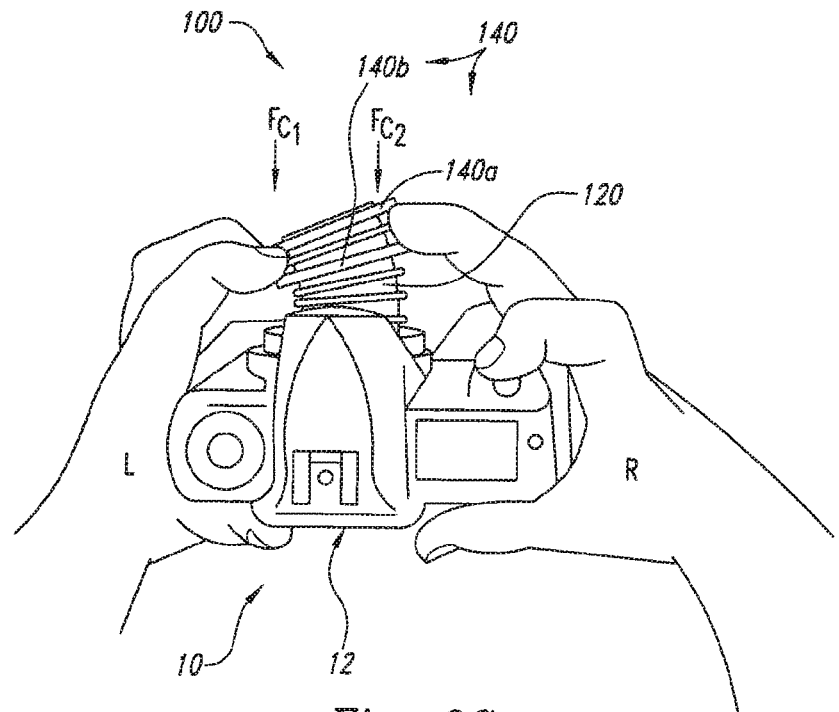
FIG. 9C is a partially schematic illustration of the camera system shown in FIG. 9A wherein at least a portion of the body is being compressed and the body is being bent to one side.
Figure 9D:
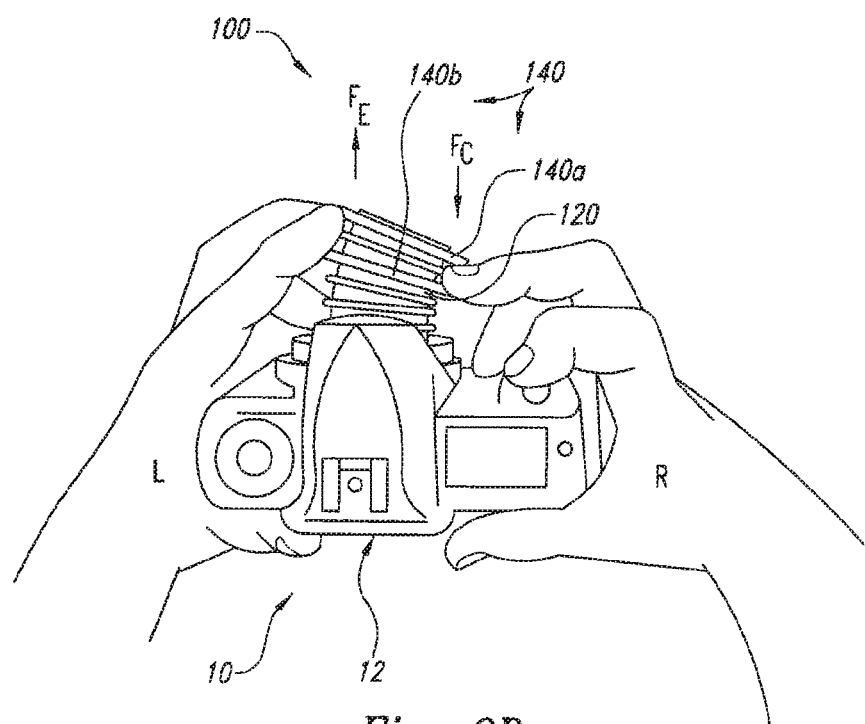
FIG. 9D is a partially schematic illustration of the camera system shown in FIG. 9A wherein an operator is bending the body to one side by applying an extending force to a first focusing collar and a compressing force to a second focusing collar.

As shown in FIG. 9C, the operator can also bend the body 120 by applying a compressing force (shown as $F_{C1}$) to one side (e.g., the left side) of the second focusing collar 140b with the bottom(s) of the operator's finger(s) and a lesser compressing force (shown as $F_{C2}$) to the other side (e.g., the right side) of the second focusing collar 140b to compress at least a portion of the lens body 120. This will have the effect of compressing and bending one or more portions of the body 120 and can move the lens 134 (not shown in FIG. 9C) toward the camera 12 and tilt the lens 134 relative to the camera 12 (or the associated image capture plane) to achieve a desired focusing effect. As shown in FIG. 9D, the operator can also apply an extending force (shown as $F_E$) to the first focusing collar 140a with the top(s) of the operator's finger(s) and a compressing force (shown as $F_E$) to the second focusing collar 140b to bend the lens body 120 and focus the camera system 10. It will be recognized that these combinations of compressing, extending, and/or bending the body 120 have been provided for illustrative purposes only and that various other combinations can be used. For example, an operator can also apply an extending force to one side of the first focusing collar 140a and a lesser extending force to another side of the first focusing collar 140a to move the lens 134 (not shown) away from the camera 12 and to tilt the lens 134 relative to the camera 12 (or image capture plane) to achieve a desired focusing effect.

As discussed above, these focusing features (e.g., compressing, extending, and/or bending the body 120) can allow the photographer to achieve two effects: (1) controlling a 'sweet spot' within the picture plane where the image is in sharp focus, with surrounding areas of the image at the same depth of field remaining less sharp or blurred; and (2) photographing a horizontal surface from an oblique point of view, effectively making the whole of that surface the principal plane of sharp focus. The benefit of the sweet-spot focusing effect is to allow the photographer to heighten the interest in a particular area of the photo and increase creative interest, without the time and effort of using image-processing software, such as Adobe® Photoshop®. Additionally, the sweet-spot focusing effect can allow a photographer to add real-time creativity to photographs and/or achieve results that would be difficult or impossible to achieve after the fact with image-processing software. The benefit of the tilt focusing effect is to allow a plane that is in an oblique angle to the image capture surface be entirely in focus rather than just partly in focus, without resorting to very low f-stops, which actually decrease the amount of light and therefore increase the risk of undesired blurring. Another benefit of certain embodiments described above is that methods of adjusting the 'sweet spot' of focus or the tilt of the lens 134 allows a much more fluid and continuously adjustable arrangement of the photo, enabling more spontaneous shots and more creative, photojournalistic-style compositions than are possible using traditional tilt-shift lenses that take a long time to properly align and/or using image-processing software.

Figure 10:
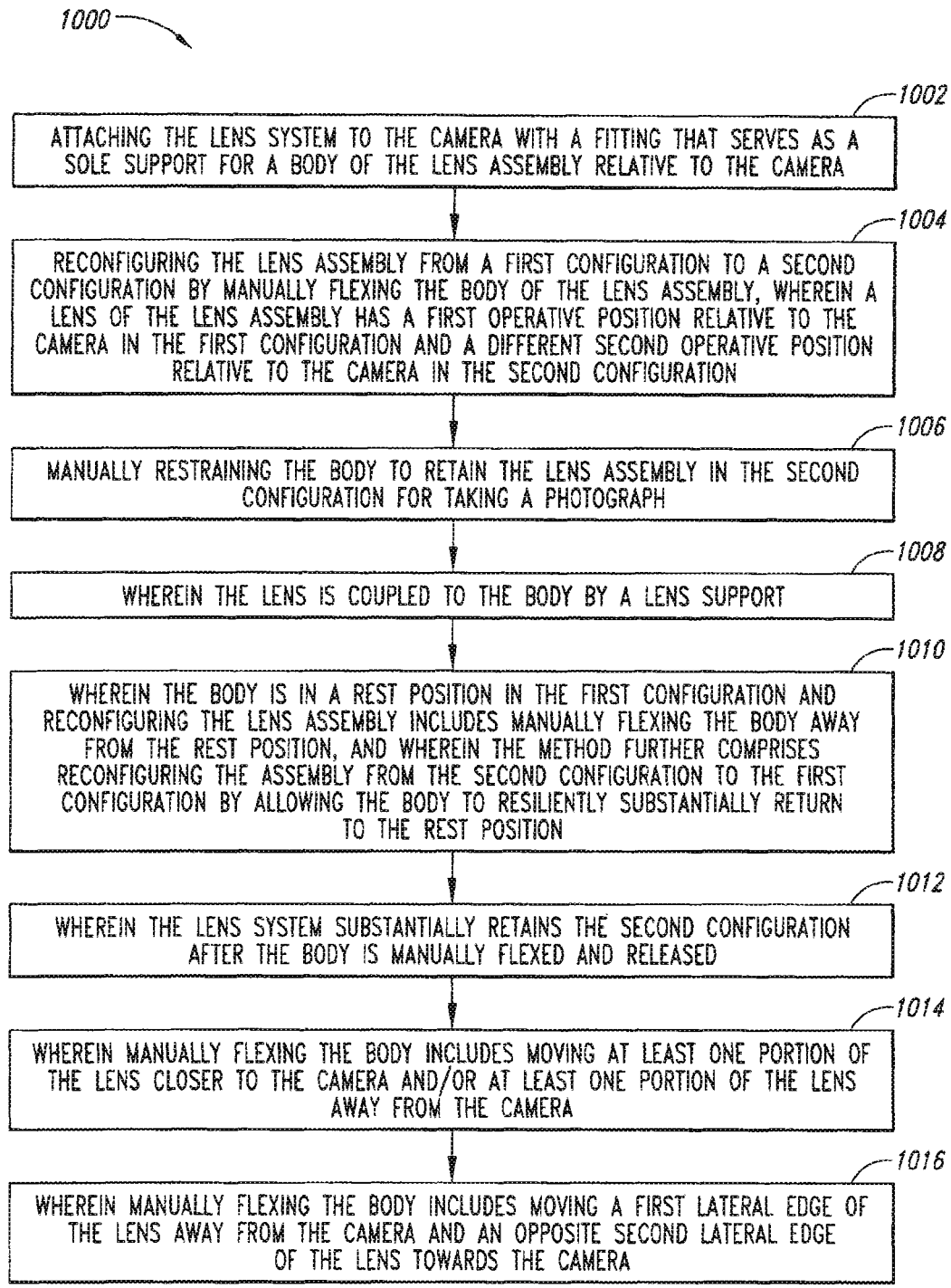
FIG. 10 is a chart containing process portions for a method of adjusting focus of a camera using a lens assembly in accordance with an embodiment of the invention.
Figure 11:
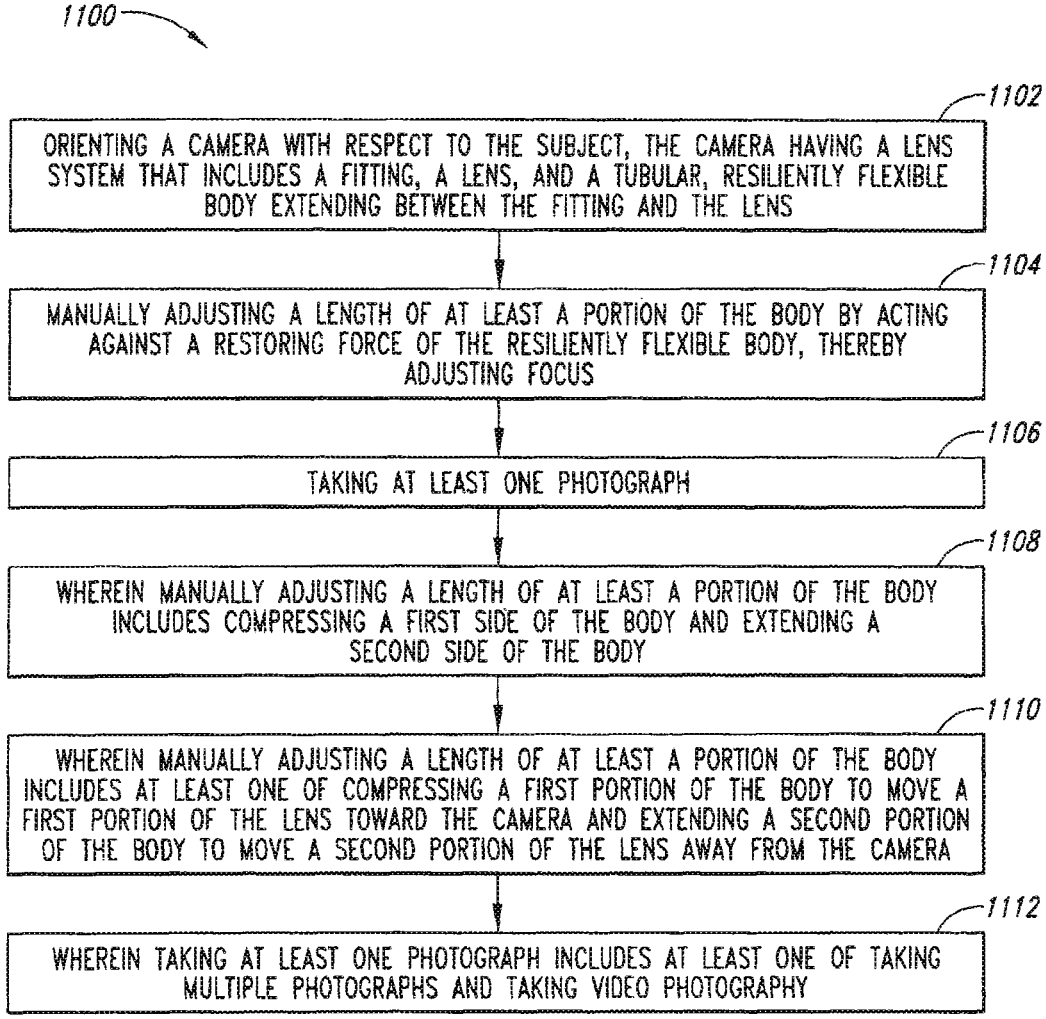
FIG. 11 is a chart containing process portions for a method of adjusting focus of a camera using a lens assembly in accordance with another embodiment of the invention.

Accordingly, FIG. 10 includes various method steps for adjusting focus of a camera in accordance with embodiments of the invention and FIG. 11 includes various method steps for photographing a subject in accordance with embodiments of the invention. In FIG. 10, a method for adjusting focus of a camera using a lens assembly 1000 can include attaching the lens system to the camera with a fitting that serves as a sole support for a body of the lens assembly relative to the camera (process portion 1002). The process can further include reconfiguring the lens assembly from a first configuration to a second configuration by manually flexing the body of the lens assembly (process portion 1004). A lens of the lens assembly can have a first operative position relative to the camera in the first configuration and a different second operative position relative to the camera in the second configuration (process portion 1004).

In certain embodiments, the method can further include manually restraining the body to retain the lens assembly in the second configuration for taking a photograph (process portion 1006). In other embodiments the lens can be coupled to the body by a lens support (process portion 1008). In still other embodiments, the body can be in a rest position in the first configuration and reconfiguring the lens assembly can include manually flexing the body away from the rest position (process portion 1010). The method can further include reconfiguring the assembly from the second configuration to the first configuration by allowing the body to resiliently substantially return to the rest position (process portion 1010). In yet another embodiment, the lens system can substantially retain the second configuration after the body is manually flexed and released (process portion 1012). Still further embodiments, manually flexing the body can include moving at least one portion of the lens closer to the camera and/or at least one portion of the lens away from the camera (process portion 1014). In yet another embodiment, manually flexing the body can include moving a first lateral edge or portion of the lens away from the camera and an opposite second lateral edge or portion of the lens towards the camera (process portion 1016).

In FIG. 11, a method for photographing a subject 1100 can include orienting a camera with respect to the subject (process portion 1102). The camera can have a lens system that includes a fitting, a lens, and a tubular, resiliently flexible body extending between the fitting and the lens (process portion 1102). The method can further include manually adjusting a length of at least a portion of the body by acting against a restoring force of the resiliently flexible body, thereby adjusting focus (process portion 1104). The method can still further include taking at least one photograph (process portion 1106).

In certain embodiments, manually adjusting a length of at least a portion of the body can include compressing a first side or portion of the body and extending a second side or portion of the body (process portion 1108). In other embodiments, manually adjusting a length of at least a portion of the body includes at least one of compressing a first portion of the body to move a first portion of the lens toward the camera and extending a second portion of the body to move a second portion of the lens away from the camera (process portion 1110). In still other embodiments, taking at least one photograph can include at least one of taking multiple photographs and taking video photography (process portion 1112).

A feature of certain embodiments described above is that a lens system with a fluidly and rapidly adjustable focus can be provided. Additionally, the lens can be inexpensive, light weight, and intuitive and easy to use. An advantage of this feature is that it can provide a photographer with the ability to rapidly take a series of photographs and to vary the images in an aesthetically pleasing manner. This can be advantageous to cameras using conventional film, digital cameras, and video cameras.

Digital photography has become increasingly popular in recent years, with sales of digital single lens reflex camera increasing 100% in 2002 and digital camera sales eclipsing film camera sales in 2003. Aspects of digital photography are significantly different from film photography. For example, single lens reflex digital cameras can offer nearly immediate feedback on the quality of a photograph just taken by displaying the image in a liquid crystal display on the camera body 12. This gives photographers using digital single reflex cameras very fast feedback on the look of a photograph before any developing expense has occurred, dramatically reducing the time and expense necessary to see a photographic image. Lens systems in accordance with certain embodiments described above can be well suited to allow digital camera users to take advantage of these digital camera features by allowing a photographer to experiment with a composition by taking a series of shots over a short period of time until finding an aesthetically pleasing result.

The above-detailed embodiments of the invention are not intended to be exhaustive or to limit the invention to the precise form disclosed above. Specific embodiments of, and examples for, the invention are described above for illustrative purposes, but those skilled in the relevant art will recognize that various equivalent modifications are possible within the scope of the invention. For example, whereas steps are presented in a given order, alternative embodiments may perform steps in a different order. The various embodiments described herein can be combined to provide further embodiments.

Unless the context clearly requires otherwise, throughout the description and the claims, the words "comprise," "comprising," and the like are to be construed in an inclusive sense as opposed to an exclusive or exhaustive sense, i.e., in a sense of "including, but not limited to." Additionally, the words "herein," "above," "below," and words of similar import, when used in this application, shall refer to this application as a whole and not to any particular portions of this application. Use of the word "or" in reference to a list of items is intended to cover a) any of the items in the list, b) all of the items in the list, and c) any combination of the items in the list.

In general, the terms used in the following claims should not be construed to limit the invention to the specific embodiments disclosed in the specification unless the above-detailed description explicitly defines such terms. In addition, the inventors contemplate various aspects of the invention in any number of claim forms. Accordingly, the inventors reserve the right to add claims after filing the application to pursue such additional claim forms for other aspects of the invention.

What is claimed is:

1. A lens system comprising:
   a lens assembly having a lens support and a lens carried by the lens support;
   a fitting mountable to a camera; and
   a resiliently flexible body extending between the lens assembly and the fitting, the fitting being the sole support for the body relative to the camera, the body being configured to position the lens among at least two operative positions relative to the camera when the fitting is mounted to the camera, and wherein the body has a rest position to which it at least approximately returns after being moved away from the rest position and released.

2. The system of claim 1, further comprising an f-stop carried by the body.

3. The system of claim 1, further comprising a focusing collar coupled to the body.

4. The system of claim 1, in which the resiliently flexibly body is structured to compress to allow the lens to be moved toward the fitting when the lens is manually forced toward the fitting from the rest position.

5. The system of claim 1, in which the resiliently flexibly body is structured to extend to allow the lens to be moved away from the fitting when the lens is manually forced away from the fitting from the rest position.

6. The system of claim 1, in which light is capable of passing through the lens and at least a center portion of the fitting when the resiliently flexible body is in the rest position.

7. The system of claim 1, in which the resiliently flexible body is structured to hold the lens assembly relatively perpendicular to the camera when the flexible body is in the rest position.

8. A lens system comprising:
   a lens;
   a fitting mountable to a camera;
   a resiliently flexible body extending between the lens and the fitting, the fitting being the sole support for the body relative to the camera, the body being configured to position the lens among at least two operative positions relative to the camera when the fitting is mounted to the camera, wherein the body includes a tubular segment and a lens support, the lens being coupled to the body by the lens support, at least one portion of the lens support being received by the tubular segment of the body and being movable relative to at least a portion of the tubular segment of the body, in which the lens support includes a tubular frustoconical lens support having a first part and second part, the first part being coupled to the body and at least one portion of the second part being received by the at least one portion of the body that is tubular, the lens being coupled to the second portion of the lens support.

9. The system of claim 8 in which at least one portion of the second part of the tubular frustoconical lens support having a smaller cross-sectional area than at least one portion of the first part of the tubular frustoconical lens support.

10. The system of claim 8, in which the resiliently flexible body is structured to compress to allow the lens to be moved toward the fitting when manually forced from the rest position.

11. The system of claim 8, in which the resiliently flexible body is structured to extend to allow the lens to be moved away from the fitting when manually forced from the rest position.

12. The system of claim 8, in which light is capable of passing through the lens and at least a center portion of the fitting when the resiliently flexible body is in the rest position.

13. The system of claim 8, in which the resiliently flexible body is structured to hold the lens assembly relatively perpendicular to the camera when the flexible body is in the rest position.

14. A lens system comprising:
   a lens assembly structured to accept a lens therein;
   a fitting mountable to a camera; and
   a resiliently flexible body extending between the lens assembly and the fitting, the fitting being the sole support for the body relative to the camera, the resiliently flexible body being configured to position the lens among at least two operative positions relative to the camera when the fitting is mounted to the camera, the resiliently flexible body having a rest position to which it approximately returns when manual force is removed from the body, and the resiliently flexible body having a strength sufficient to hold the lens assembly approximately perpendicular to the camera when the resiliently flexible body is in the rest position.

15. The system of claim 14, further comprising an f-stop carried by the body.

16. The system of claim 14, further comprising a focusing collar coupled to the body.

17. The system of claim 14 in which the lens includes a first lens, and in which the system further comprises at least one second lens coupled to the body.

18. The system of claim 14 in which at least one portion of the body is tubular.

19. The system of claim 14 in which at least one portion of the body is tubular, and in which the system further comprises a tubular frustoconical lens support having a first part and second part, the first part being coupled to the body and at least one portion of the second part being received by the at least one portion of the body that is tubular, the lens being coupled to the second portion of the lens support.

20. The system of claim 14 in which the body is couplable to at least one optical device.

21. The system of claim 14 in which the fitting is mounted to a camera.

* * * * *